(12) United States Patent
Froseth et al.

(10) Patent No.: US 10,433,574 B2
(45) Date of Patent: Oct. 8, 2019

(54) REDUCED SUGAR PRE-SWEETENED BREAKFAST CEREALS COMPRISING TRI- AND TETRA SACCHARIDES AND METHODS OF PREPARATION

(71) Applicant: General Mills, Inc., Minneapolis, MN (US)

(72) Inventors: Barrie R. Froseth, Plymouth, MN (US); Christine Nowakowski, Plymouth, MN (US)

(73) Assignee: General Mills, Inc., Minneapolis, MN (US)

( * ) Notice: Subject to any disclaimer, the term of this patent is extended or adjusted under 35 U.S.C. 154(b) by 96 days.

(21) Appl. No.: 15/463,441

(22) Filed: Mar. 20, 2017

(65) Prior Publication Data

US 2017/0188610 A1   Jul. 6, 2017

Related U.S. Application Data

(60) Division of application No. 12/652,054, filed on Jan. 5, 2010, now abandoned, which is a continuation of
(Continued)

(51) Int. Cl.
| | | |
|---|---|---|
| *A23P 1/08* | (2006.01) |
| *A23L 1/09* | (2006.01) |
| *A23L 1/10* | (2006.01) |
| *A23L 7/122* | (2016.01) |
| *A23G 3/34* | (2006.01) |
| *A23L 27/30* | (2016.01) |
| *A23L 33/20* | (2016.01) |
| *A23P 20/00* | (2016.01) |

(52) U.S. Cl.
CPC .............. *A23L 7/122* (2016.08); *A23G 3/343* (2013.01); *A23L 27/33* (2016.08); *A23L 33/20* (2016.08); *A23G 2200/06* (2013.01); *A23P 20/00* (2016.08); *A23V 2002/00* (2013.01)

(58) Field of Classification Search
CPC .......... A23L 7/122; A23L 33/20; A23L 27/33; A23G 3/343; A23P 20/00
See application file for complete search history.

(56) References Cited

U.S. PATENT DOCUMENTS

| | | |
|---|---|---|
| 3,246,990 A | 4/1966 | Thompson et al. |
| 3,464,827 A | 9/1969 | Tsuchiya et al. |
| (Continued) | | |

FOREIGN PATENT DOCUMENTS

| | | |
|---|---|---|
| EP | 1582105 | 10/2005 |
| GB | 1225040 | 3/1971 |
| (Continued) | | |

*Primary Examiner* — Kelly J Bekker
(74) *Attorney, Agent, or Firm* — Diederiks & Whitelaw, PLC; Gregory P. Kaihoi, Esq.

(57) ABSTRACT

A reduced sugar presweetened ready to eat breakfast cereal is prepared by coating dried cereal base pieces or food pieces with a reduced-sugar composition comprising maltotriose, maltotetrose in full or partial substitution for sucrose, and a high potency sweetener. The reduced-sugar coating can have a sucrose content of less than 70%, yet provides taste, texture, appearance, and bowl life that mimics presweetened R-T-E cereals having a coating with more sucrose.

18 Claims, 4 Drawing Sheets

Related U.S. Application Data application No. PCT/US2009/063946, filed on Nov. 11, 2009.

(60) Provisional application No. 61/142,972, filed on Jan. 7, 2009.

(56) References Cited

U.S. PATENT DOCUMENTS

| | | | |
|---|---|---|---|
| 3,600,193 | A | 8/1971 | Glabe et al. |
| 3,687,687 | A | 8/1972 | Liepa et al. |
| 3,788,910 | A | 1/1974 | Stewart et al. |
| 4,378,377 | A | 3/1983 | Gajewski |
| 4,540,587 | A | 9/1985 | Gajewski |
| 4,608,263 | A | 8/1986 | Bergin et al. |
| 4,741,910 | A | 5/1988 | Karwowski et al. |
| 4,814,267 | A | 3/1989 | Zeikus et al. |
| 5,093,146 | A | 3/1992 | Calandro et al. |
| 5,709,902 | A | 1/1998 | Bartolomei et al. |
| 6,139,886 | A | 10/2000 | Green et al. |
| 6,149,965 | A | 11/2000 | van Lengerich et al. |
| 8,137,720 | B2 | 3/2012 | Green et al. |
| 8,414,954 | B2 | 4/2013 | Nowakowski et al. |
| 2001/0002271 | A1 | 5/2001 | Duffett |
| 2005/0255218 | A1 | 11/2005 | Green et al. |
| 2005/0266142 | A1* | 12/2005 | Green ............... A23L 7/122 426/618 |
| 2006/0177545 | A1 | 8/2006 | Haynes et al. |
| 2007/0031575 | A1 | 2/2007 | Green et al. |
| 2007/0110844 | A1* | 5/2007 | Kubantseva ........ A23G 3/343 426/5 |
| 2007/0116819 | A1 | 5/2007 | Prakash et al. |
| 2007/0116821 | A1 | 5/2007 | Prakash et al. |
| 2007/0172511 | A1 | 7/2007 | Harrison et al. |
| 2007/0237880 | A1* | 10/2007 | Coleman ............. A23P 10/28 426/620 |
| 2007/0298152 | A1 | 12/2007 | De Baets |
| 2011/0061645 | A1 | 3/2011 | Fosdick et al. |

FOREIGN PATENT DOCUMENTS

| | | | |
|---|---|---|---|
| GB | 1511392 | 5/1978 | |
| WO | WO-0042867 A1 * | 7/2000 | ............. A23L 7/126 |

* cited by examiner

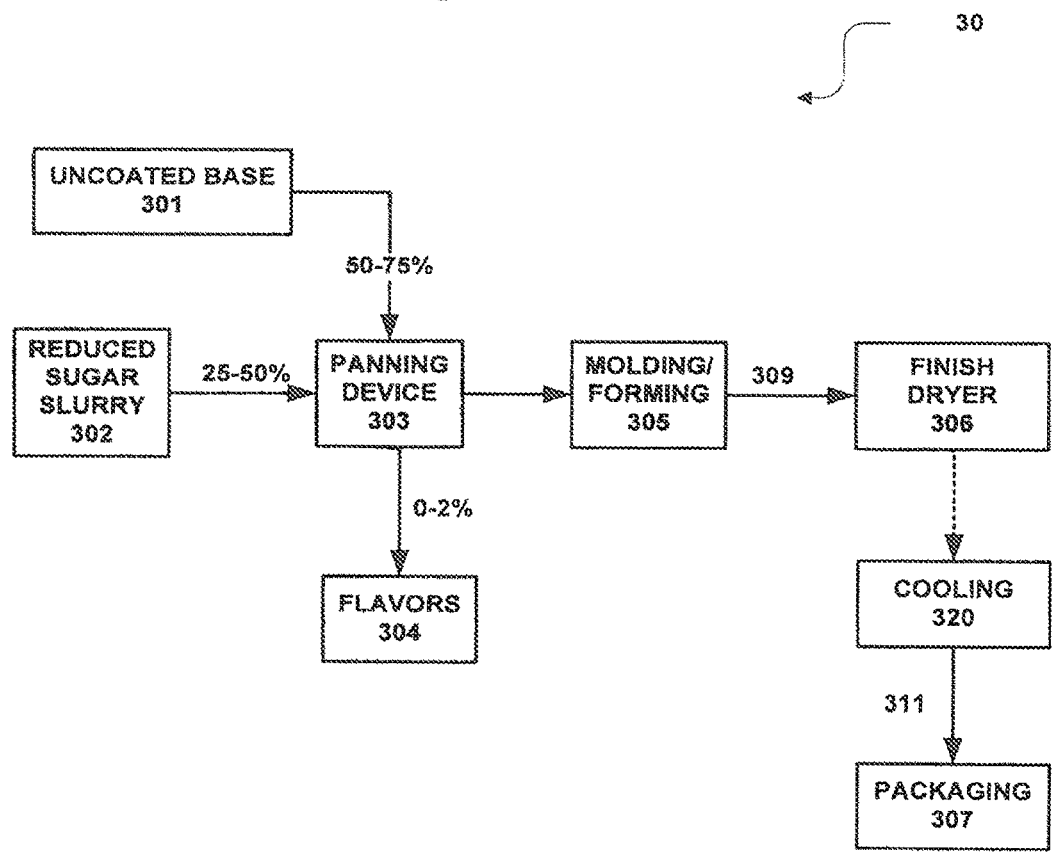

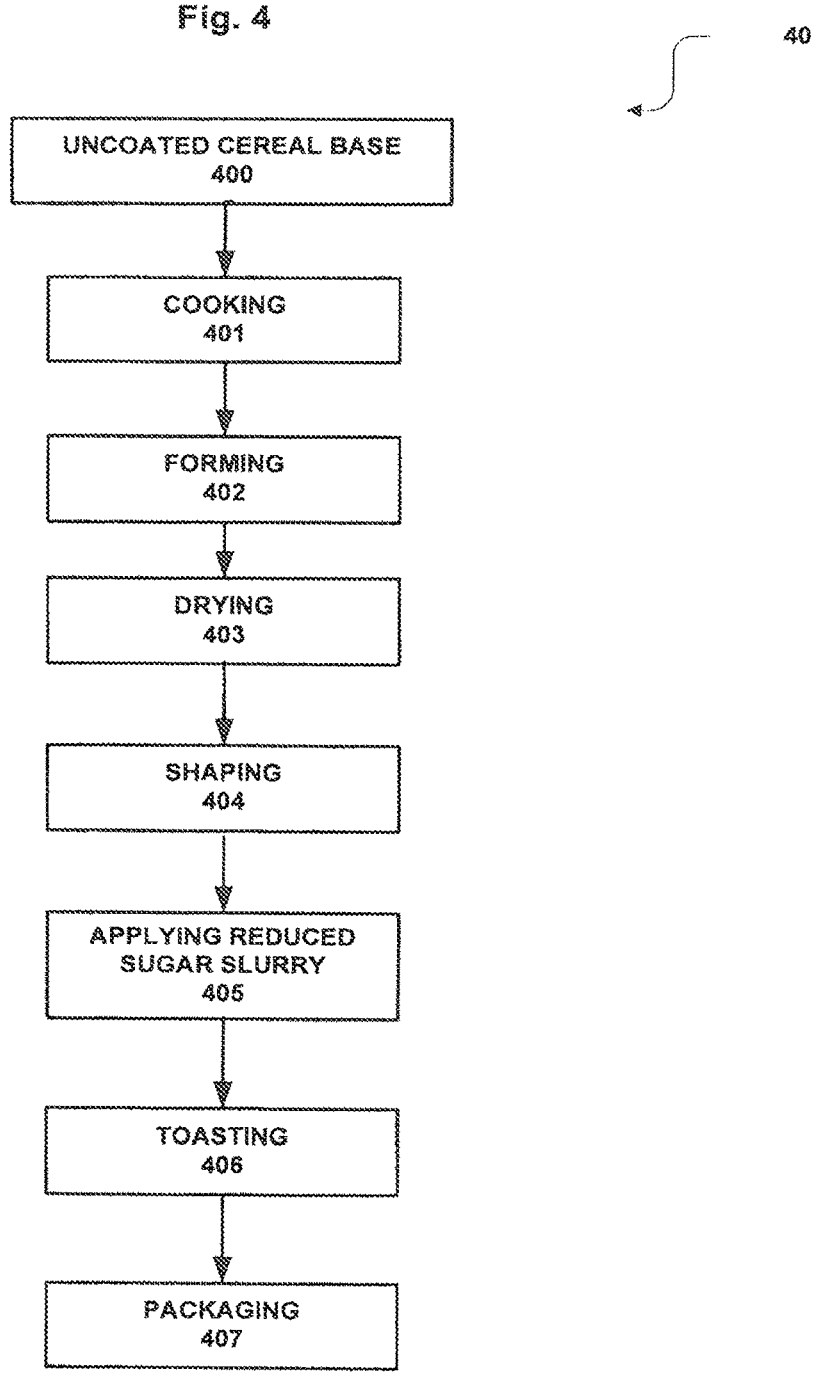

REDUCED SUGAR PRE-SWEETENED BREAKFAST CEREALS COMPRISING TRI- AND TETRA SACCHARIDES AND METHODS OF PREPARATION

CROSS-REFERENCE TO RELATED APPLICATIONS

This application represents a divisional application of U.S. patent application Ser. No. 12/652,054 filed Jan. 5, 2010 entitled Reduced Sugar Pre-Sweetened Breakfast Cereals Comprising Tri- and Tetra Saccharides and Methods of Preparation, abandoned, and also represents a continuation of PCT/US2009/063946, filed Nov. 11, 2009, each of which claims the benefit of U.S. Provisional Patent Application Ser. No. 61/142,972 filed Jan. 7, 2009. The entire contents of these applications are incorporated herein by reference.

FIELD OF THE INVENTION

The present invention relates to food products and to methods to prepare food products, more particularly, to food products having reduced sugar coating compositions and comprising tri- and tetrasaccharides, to food products including such reduced sugar coating compositions such as breakfast cereals, and to their methods for their preparation.

BACKGROUND OF THE INVENTION

Cereal products, particularly ready-to-eat (hereinafter "R-T-E") breakfast cereals, are well-known and popular food items, particularly presweetened R-T-E cereals. Typically, such products include various coatings usually comprising nutritive carbohydrate sweeteners such as sucrose, sugar alcohols, corn syrup, dextrose, polydextrose, fructose, high fructose corn syrup, fiber syrups, grain syrups, honey, hydrogenated starch, inulin, molasses, polyols, rice syrups, sorghum syrup, etc. Also known are presweetened R-T-E cereals comprising coatings that include a high potency sweetener (See for example, U.S. Pat. No. 4,378,377, issued Mar. 29, 1983, entitled "Cereal Presweetened With Aspartame And Method Of Preparation," and U.S. Pat. No. 4,540,587, issued Sep. 10, 1985, entitled "Cereal Presweetened With Aspartame And Cold Water Soluble Gum Coating And Method Of Preparation," each to Gajewski).

Presweetened breakfast cereals are typically prepared by first producing unsweetened cereal pieces, coating the cereal pieces with an aqueous slurry or solution of sweeteners, and then drying the coated pieces in an oven or air current to remove the added moisture.

One problem with sugar coated R-T-E cereals is the high amount of sugar in the finished product that is necessary to impart sweetness and assist in maintaining the desired texture in milk, referred to as bowl life. As used herein, "sugar" includes mono- and disaccharides such as glucose, fructose, maltose, lactose, and sucrose, but most commonly means sucrose, otherwise known as table sugar. The sugar content of R-T-E cereals can be reduced by substituting sugar with one or more high potency artificial sweeteners such as aspartame, saccharin, and sucralose, and/or by using natural sweeteners such as low conversion corn syrups or corn syrup solids. While useful in reducing the sugar content of R-T-E cereals, the finished products containing such substitutes often suffer from the absence of certain physical and organoleptic attributes provided by the presence of sugar-based coatings. In particular, the products can lack the bite or crispness and bowl life in milk exhibited by sugar coatings and require special packaging to minimize water absorption.

Those skilled in the art will appreciate that low conversion corn syrups and syrup solids are particularly useful sugar substitutes because they are less expensive than sucrose—averaging about (~) ⅓ the price per pound for sucrose. In addition, corn syrups' physical properties, namely their hygroscopicity, tendency to resist crystallization, and adhesiveness, make them useful binders in products such as cereal bars. Corn syrups, especially low conversion corn syrups, are particularly useful processing agents in sugar slurries because they slow the crystallization of sucrose and prevent food pieces from crumbling.

To meet certain manufacturing efficiencies, however, the amount of corn syrup used must be kept in careful balance with other ingredients. For example, because corn syrup lacks the crystalline structure of sucrose, cereal pieces coated with corn syrup in excess of ~20% of the dry weight basis of the R-T-E cereal formulation will stick together and clump in doublets or triplets. These clumps are undesirable in the finished product and must be removed before packaging, which reduces production yield. Corn syrup also reduces production efficiencies by increasing the time and capital equipment necessary to sufficiently lower the moisture content of the cereal pieces to desirable levels. Another drawback of using a low conversion corn syrup as a sugar substitute is its tendency to take up moisture (hygroscopicity) requires that cereals including corn syrup must be shielded from humidity with special packaging.

Given the state of the art as described above, there is a continuing need for improved reduced-sugar coatings and for coated comestibles prepared therewith that have physical and organoleptic properties similar to those coatings with more sucrose.

The present invention satisfies this need by providing coating compositions or binders with reduced sugar levels comprising polysaccharides with three or more monosaccharide subunits such as maltotriose and maltotetrose, and at least one high potency sweetener, as well as reduced sugar comestibles topically coated or bound with such compositions, such as R-T-E cereals, clusters, cereal bars, and other food products.

BRIEF SUMMARY OF THE INVENTION

In its product aspect, the present invention provides reduced sugar coating and binder compositions comprising a reduced-sugar slurry enriched in maltotriose and maltotetrose instead of sucrose and a high potency sweetener(s). Maltotriose and maltotetrose can be classified as tri- and tetrasaccharides with a degree of polymerization ("DP") of three (3) and four (4) respectively. Those skilled in the art will appreciate that a shorthand nomenclature for maltotriose can be DP3, and a shorthand nomenclature for maltotetrose can be DP4.

In the present invention, a mixture of DP3 and DP4 can comprise ~5-99% of the slurry. The high potency sweetener(s) can comprise ~0.01-2% of the slurry and include sufficient amounts to provide the coating composition with a sweetness level comparable to sucrose. The sugar content of the slurry can be ~70% and less.

In another product aspect, the present invention resides in comestibles including the reduced-sugar slurry as a topical coating or binder. The comestibles can include a food base and the reduced-sugar slurry in a weight ratio ranging from ~3:1 to ~1:1. The base can be a quantity of food pieces of one or more types such as dried food pieces fabricated from a cooked cereal dough or clusters of food ingredients. The combined coating and food base is dried to a moisture content of less than 5%, including ~1-2.5%.

In its method of preparation aspect, the present invention resides in methods of preparing reduced sugar comestibles, comprising the steps of:

A. providing a base of food pieces;

B. applying a reduced-sugar composition as a coating or binder in the form of a slurry, said composition comprising a mixture of DP3 and/or DP4, sucrose sugar, and at least one high potency sweetener, and wherein the sugar content of the composition is ~70% or less to provide an enrobed or coated base; and C. drying the coated or bound base to a moisture content of less than 5% to provide a dried finished product having a reduced sugar coating.

BRIEF DESCRIPTION OF THE DRAWINGS

The invention can be better understood by reference to the following drawings, wherein:

FIG. 3 is a schematic process flow diagram of a further embodiment of the present method of preparing a reduced-sugar food product.

FIG. 4 is a schematic process flow diagram of yet another embodiment of the present method of preparing a reduced-sugar food product.

DETAILED DESCRIPTION OF THE INVENTION

Figure 1:
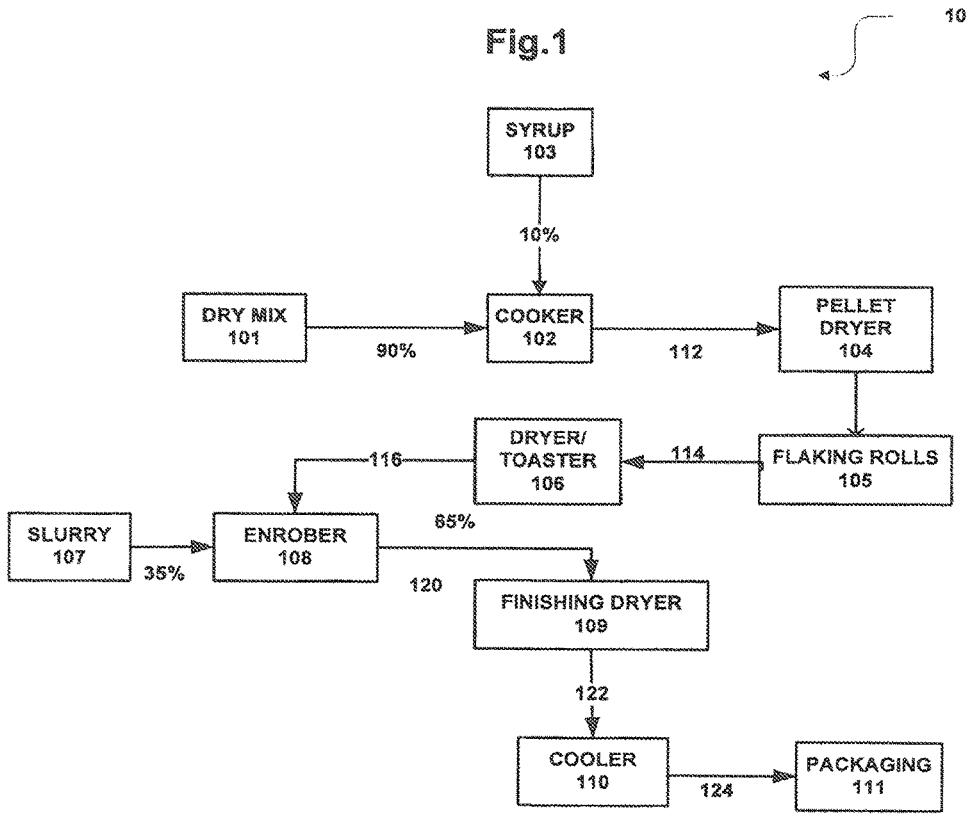
FIG. 1 is a schematic process flow diagram of an embodiment of the present method of preparing a reduced-sugar food product.

The present invention relates to a reduced-sugar coating or binder prepared from a slurry that includes a reduced-sugar composition comprising sucrose sugar as its principal ingredient, and further including a DP3 and/or a DP4 carbohydrate such as maltotriose, maltotetrose in full or partial substitution for the sucrose, and at least one high-potency sweetener. Other ingredients such as such as other carbohydrates, triglycerides, vitamins, minerals, and flavors can be added to the coating composition to provide the coating composition and/or mixed with the cereal base or other product components to enhance the finished product's organoleptic properties or nutritional value.

In the following detailed description, reference is made to the accompanying drawings that form a part hereof, and in which are shown by way of illustration specific embodiments or examples. These embodiments can be combined, other embodiments can be utilized, and structural, logical, and procedural changes can be made without departing from the spirit and scope of the present invention. The following detailed description is, therefore, not to be taken in a limiting sense, and the scope of the present invention is defined by the appended claims and their equivalents.

Throughout the specification and claims, percentages are by weight and temperatures in degrees Centigrade unless otherwise indicated. Each of the referenced patents or patent applications is incorporated herein by reference.

In one form, the coating composition can be provided in the form of an aqueous solution (or "slurry" as colloquially referred to in the breakfast cereal industry) suitable for application to a comestible base such as a breakfast cereal base comprising added moisture for dissolution and application in liquid form. The present compositions can also be provided in the form of a finish dried coating or binder form such as after having added moisture removed such as the finish drying described below.

For example, the reduced-sugar coating composition can comprise:

TABLE 1

| Ingredient | Weight % (dry) | Preferred | Most Preferred |
|---|---|---|---|
| Sugar | ≤70% | ≤50% | 30-40% |
| Maltotriose & Maltotetrose | 5-99% | 10-80% | 40-80% |
| High potency sweeteners | 0.01-2% | 0.01-1.5% | 0.03-0.7% |
| Sugar alcohols | 0-15% | 1-15% | 1-12% |
| Triglyceride | 0-40% | 0-10% | ≤10% |

As shown in Table 1, an embodiment of the present coating or binder composition includes a mixture of maltotriose and maltotetrose although maltotriose can be used alone in the relative amounts shown above. Maltotriose is a polysaccharide comprising three monosaccharide units and is included in the reference to DP3. Maltotetrose's degree of polymerization is four monosaccharide units and is included in the reference to DP4. Although maltotriose and maltotetrose typically comprise a linked polymer of 3 and 4 glucose subunits respectively, those skilled in the art will appreciate that DP3 and DP4 polymers can include other sugar monomers such as fructose and combinations of glucose and fructose that can be suitable equivalents to glucose-only DP3 and DP4. Thus, while maltotriose is the preferred DP3 material herein and maltotetrose is the preferred DP4 material for use herein, other DP3 and DP4 carbohydrates of approximately equivalent molecular weight can also be beneficially employed herein.

Maltotriose and maltotetrose are present in relatively small amounts in aqueous extracts derived from the conversion of starchy materials, such as corn into fermentable sugars, but technology has developed to enrich the concentrations of DP3 and DP4 in corn syrups from their native levels up to highly concentrated in these particular carbohydrates. (See, for example. U.S. Pat. No. 3,788,910 "Extraction and Purification of Maltotriose and Maltodextrose" issued Jan. 29, 1974 to Stewart et al.; U.S. Pat. No. 4,814,267 "Method for Preparing High Conversion Syrups and Other Sweeteners" issued Mar. 21, 1989 to Zeikus, et al.). The present DP3 and DP4 materials are commercially available. For example, commercial sources of maltotriose and maltotetrose include Sigma-Aldrich of St. Louis, Mo. (which provides pure pharmaceutical or reagent grade materials) which can provide pure sources and Cargill of Minneapolis, Minn. (which provides lower cost, food grade materials). Such DP3 and DP4 materials can also be provided as sugar blends that are rich (i.e., 20-60% of DP3/DP4 materials) along with other longer chain carbohydrates that are also low (i.e. see less than 5%) in DPI or DP2 sugars. Such material can be provided in both solid and liquid forms (i.e. a DP3 and DP4 rich sugar syrup. DP3 and DP4 rich sugar syrups are highly preferred for use herein since such syrups are more easily handled in commercial food processing than solids.

Such DP3 and DP4 materials can also be provided as sugar blends that are rich (i.e., 20-60% DP3/DP4 materials) along with other longer chain carbohydrates that are also low (i.e., less than 5%) in DP1 or DP2 sugars (e.g., sucrose). Such materials can be provided in both solid form (e.g., a granular powder) and in liquid form (i.e., a DP3 and DP4 rich syrup). DP3 and DP4 rich syrups are preferred for use herein since such syrups are more easily handled in commercial food processing manufacturing operations.

The unexpected and surprising benefits of using the reduced-sugar composition to prepare a reduced sugar cereal or other product include lower stickiness functionality and efficient drying of the cereal during processing. Similar to the crystalline structures of sucrose, maltotriose and maltotetrose tend to orient themselves in crystalline structures that are particularly useful in many food products, including R-T-E cereals. For example, the crystalline like structure and nature of DP3 and DP4, such as sucrose, helps drives water out during R-T-E cereal production and reduce the numbers of undesirable doublets (i.e., two coated cereal pieces stuck together) and triplets. The crystalline structures also give food pieces a frosty appearance.

In addition, maltotriose and maltotetrose are less hygroscopic than corn syrups and therefore tend to absorb less water during shelf life and reduce the tackiness between individual food pieces, which in turn, promotes the free-flow of cereal products from their packaging and reduces undesirable clumping during extended storage. Also, the tendency for finished products to stale or lose their desired crispness due to moisture pick-up is also reduced. Surprisingly, DP3 and DP4, much such as sucrose sugar, provide food products such as R-T-E cereals with resistance to dissolution in milk, i.e., a desirable bowl life. These desirable properties make maltotriose and maltotetrose well suited to enhance the organoleptic properties of R-T-E cereals when immersed in cold milk, while also preserving the production and manufacturing efficiencies normally associated with processes that use more sugar.

An embodiment of the present invention includes a reduced-sugar coating composition comprising a mixture of DP3 and DP4 of ~5-99% of the composition. A preferred embodiment includes a DP3/DP4 mixture of ~10-80% of the composition. A most preferred embodiment includes a DP3/DP4 mixture of ~40-80%.

The DP3/DP4 mixture can further comprise ~35-45% DP3 and ~15-25% DP4 and conveniently can be provided solid or in an aqueous solution. Surprisingly, increasing the percentage of DP3 in the mixture also serves to enhance the desirable properties of the coating. Thus, a reduced-sugar slurry comprising up to 100% DP3 can be employed for the products and methods disclosed herein, including frosted cereals.

The reduced-sugar composition can additionally include ~1-50% corn syrup or corn syrup solids. Corn syrup solids are desirable due to their low cost, wide availability and, high sweetness level. However, the particular levels for corn syrup higher levels of corn syrup depends upon the particular end use applications of the present coating or binder compositions due in part to the highly hygroscopic properties of corn syrup. For example, the present compositions find particular suitability for use as a pre-sweetener coating for R-T-E cereals to provide low sugar products that nonetheless have eating and bowl life qualities comparable to conventional high sugar pre-sweetened products. In pre-sweetener coating for R-T-E cereals, corn syrup and/or corn syrup solids can comprise ~1-40% of the coating composition, preferably ~5-25%. As described briefly above, R-T-E cereal products that include pre-sweetener coatings prepared from coating compositions having high corn syrup levels can exhibit undesirable blocking or clumping of the pre-sweetened product in the cereal box upon storage, especially under humid conditions leading, to elevated levels of consumer complaints. Moreover, commercial production of such products can be adversely affected by the formation of clusters or clumps of products during manufacture rather than a desired free flowing blend of such coated pieces. Such defective clusters must be removed such as by scalping prior to packaging leading to production losses. Also, these high corn syrup level compositions can be more difficult to finish dry since high levels of highly the hygroscopic corn syrup impart more hydroscopicity to such compositions requiring extended drying times to form finished products sufficiently dry for shelf stable storage. Not only are production rates adversely affected but costs are higher due to the extra dryer time and energy required to drive the product to needed final moisture values.

However, in another embodiment, the hydroscopicity of corn syrup solids is an advantage such as when the present reduced sugar coating compositions are used to provide binder compositions. For example, binder compositions are commonly used in a wide variety of food application especially for use to provide granola or cereal bar products or cereal nuggets or clusters. In such applications, compositions including higher levels of corn syrup or corn syrup solids are tackier and such tackiness properties are well suited for such applications. Thus, in those embodiments wherein the present reduced sugar level coating compositions are formulated to functions as a binder, the corn syrup level can range more broadly and can comprise ~1-60% of the coating composition, preferably ~20-50%.

A further embodiment of the present invention includes an amount of sugar, primarily sucrose, of ~70% or less. A preferred embodiment includes ~50% or less sugar. A most preferred embodiment has sugar in the range of ~30-40% of the slurry.

DP3 and DP4 sugars such as maltotriose and maltotetrose, however, are typically only ~⅓ as sweet as sucrose. Thus, the present coating compositions can include a supplemental high potency sweetener to provide for supplemental sweetness to provide, for example, sweetness levels comparable to conventional pre-sweetener compositions comprising sucrose (i.e., not having sucrose substitution by DP3-DP4 materials as herein). Of course, the precise amount of added high potency sweetener can vary depending upon such factors as the amount of substitution of sucrose by the present DP3-DP4 materials as well as taste preferences and intended end use applications.

High potency sweeteners suitable for the present invention include both natural and synthesized materials. Highly preferred materials herein due to their cost, regulatory approval and thermal stability include potassium acetylsulfame, sucralose, or mixtures thereof. Alitame, neotame, saccharin, and cyclamates can also be employed subject to price constraints, availability, consumer acceptance, and governmental regulation. Thaumatin can also be used and provides the advantage of flavor masking off flavors. In another embodiment, trehalose and/or tagatose can be included for sweetness enhancement. In yet another embodiment, the slurry mix can include supplemental high potency "natural" or plant sweeteners such as *stevia, stevia* extracts, to han fruit extracts, and rubusoside. Lo Han fruit extract (a.k.a. to han kuo, lo han quo, arhat fruit, monks fruit) is derived from the fruit of the plant Siraitia grosvenorii. This extract also has been refined and will likely produce other sweetness-active isolates. Another high potency natural sweetener, rubusoside, can be extracted from the leaves of *Rubus suavissimus* (Chinese blackberry).

*Stevia* is derived from ground *stevia* leaf, which is an herb, *Stevia rebaudiana*, that is native to Peru and Paraguay.

Stevia extracts can be further refined to include isolations, refinements or separations of active compounds within the stevia extract, one example of which is rebaudioside A (a.k.a. rebiana). A reliable commercial source of stevia extract includes Cargill of Minneapolis, Minn., which manufactures the extract under the brand name Truvia®. Those skilled in the art will appreciate that other steviosides and rebaudiosides exist as part of stevia extract that can be suitable for an embodiment of the invention.

Of course, from time to time, additional high potency sweeteners will be developed or approved for use in consumer food products for human or animal consumption and their use herein is contemplated within the scope of the present invention.

An embodiment of the present invention includes one or more high potency sweeteners in amounts of ~0.01-2%. A preferred embodiment includes ~0.01-1.5% high potency sweetener. A most preferred embodiment has high potency sweetener in the range of ~0.03-0.7% of the slurry.

The reduced-sugar compositions can include other ingredients such as sugar alcohols and triglycerides. A variation of the present invention includes sugar alcohols in amounts of ~0-15%, or preferably, ~1-15%. A preferred embodiment includes ~1-12% sugar alcohol. An embodiment with triglyceride includes amounts in of ~1-40%, including ~1-10%, and less than 10%.

In another embodiment, the present reduced sugar coating compositions can include a soluble fiber such as inulin, polydextrose, hydrolyzed guar gum and mixtures thereof. A good description of the use of such soluble fiber ingredients in coatings for R-T-E cereals can be found in U.S. Pat. No. 6,149,965 "Cereal Products with Inulin and Methods of Preparation" issued Nov. 21, 2000 to Van Lengerich et al. The present reduced sugar compositions can include 0.1% to ~40%, preferably ~1-20% and for best results ~5% of soluble fiber.

As noted above, the present reduced sugar compositions find particular suitability for use as a sweetener coating or topping to provide sweet coated food product. Thus, in one embodiment, the present invention resides in finished food products comprising a base having the present low sugar coating compositions applied thereto. The present coating compositions can be applied to partially or entirely coat the food base. In preferred form, the food base is in the form of a loose or free flowing quantity of individual food pieces. The food pieces can be of any food type that are is desired to be provided with a reduced-sugar coating and include, for example, R-T-E cereals, puffed popcorn or other grains, nuts, candies, pretzels, dried fruits (e.g. raisins), and clusters of the same. The present methods find particular utility in providing R-T-E cereals with a reduced-sugar coating. In the following detailed description of the present invention, even though particular reference is made to a base comprising R-T-E cereals, it is understood that the present invention also finds application in other food areas.

The amount of coating applied to the food base can vary widely from ~1:10 to ~5:1 depending upon the particular end use application and amount of coating desired. For example, in the provision of presweetened R-T-E cereals the ratio of coating to base can range from ~1:10 to ~2:1. In preferred embodiments for R-T-E cereals, the ratio can range from ~2:1 to ~1:2 and for best results ~1:3 to ~1:1 of coating to base.

In those applications in which the present low sugar compositions are employed as a binder such as for a cereal bar such as a granola bar, the amount of composition to food base will depend in important part upon the desired physical properties of the finished food product. For example, to provide a finished granola bar having sufficient structural integrity to remain in bar form during distribution and during consumption, the ratio of reduced sugar composition to food base can range from ~1:2 to 2:1, and most preferably ~1:1.

In still other variations, the present low sugar compositions can be provided in a discrete or separate package for application to the food base by the consumer. For example, the composition can be provided in a form suitable for use as an icing for application to a baked good such as toaster strudel. In this execution, the composition can be disposed within suitable packaging (e.g., fabricated from a moisture barrier flexible packing film fabricated into a pouch) and provided as a component of a kit article comprising the food base, the low sugar composition and instructions for use or application of the coating composition.

The present invention further relates to methods for preparing products coated with or bearing the present the reduced-sugar compositions. In particular the present methods can include a step of applying a slurry of the present reduced-sugar compositions thereof to a food base to prepare a reduced-sugar product such as reduced sugar presweetened R-T-E or breakfast cereal or other product.

Figure 2:
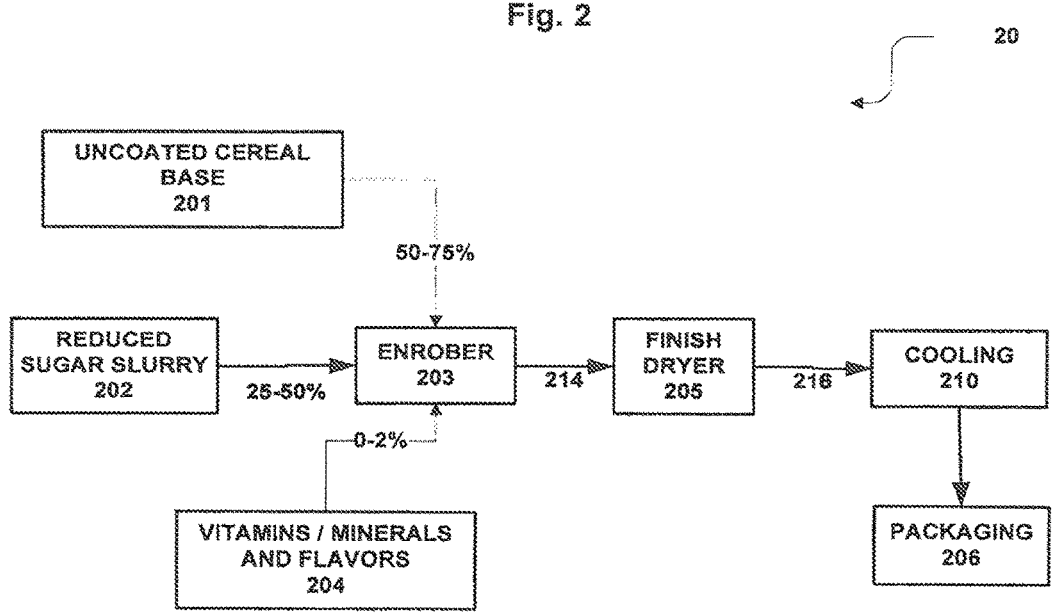
FIG. 2 is a schematic process flow diagram of another embodiment of the present method of preparing a reduced-sugar food product.

Referring now generally to FIG. 2, there is shown an embodiment of the present method of preparation generally designated by reference numeral 20. As there depicted, the present methods 20 of preparation can comprise a step of providing a quantity of base of dried food pieces 201 that can be charged or fed into an enrober 203 or other suitable coating device. The present methods can further include a step of applying a DP3/DP4 rich reduced sugar composition of the present invention in the form of a liquid aqueous slurry 202 to the enrober 203 to provide an enrobed or coated base 214. The method can further include the step of removing the added moisture supplied by the slurry 202 such in a finish drying step 205 practiced in a finish dryer to provide a dried finished product having a DP3/DP4 rich sugar coating 216. The methods can further include a packaging step 206 to provide a packaged food article comprising the present dried finished food product article.

In a preferred embodiments the food pieces or base 201 can be cereal base pieces, especially uncoated cereal base pieces, and can be of any geometric configuration or form including, for example, flakes or puffs, shreds, biscuits, mini biscuits, "O"s, or the like. The present invention finds particular utility in the coating of puffed cereals especially those prepared by direct expansion from a twin crew extruder cooker. Such cereal particles are prepared in the usual manner and can be either toasted or untoasted.

In other variations, the food pieces can be pretzels, nuts, candies, fried fruit, puffed fried food snacks.

Any conventional puffed cereal or method of preparation can be used herein to provide a puffed cereal base. The art is replete with such compositions and their methods of preparation and the skilled artisan will have no problem selecting suitable compositions or methods of preparation. Exemplary compositions and methods of puffed cereal preparation are found in, for example, U.S. Pat. No. 3,464,827, (issued Sep. 2, 1969 to T. Tsuchiya, et al.); U.S. Pat. No. 3,600,193, (issued Aug. 17, 1971 to E. F. Glabe, et al.); U.S. Pat. No. 3,246,990, (issued Apr. 19, 1966 to Thompson, et al.); and U.S. Pat. No. 3,687,687, (issued Aug. 29, 1972 to A. L. Liepa). Such products can be puffed from whole pieces of grains, e.g., puffed rice, wheat or corn or can be prepared from cooked cereal doughs.

Particularly useful herein are smooth puffed pieces such as puff base or "O" or ring shaped pieces or spheres. Such pieces can be fabricated from cooked cereal doughs containing oats, corn, wheat, rice, barley, sorghum, millet, and mixtures thereof and blends of such pieces. Minor cereal grains such as amaranth, triticale, and the like are also known and can be used. The present invention finds particular suitability for use in connection with ring shaped puffed pieces fabricated from oat based cooked cereal dough.

In one variation, a variety of dry and wet cereal ingredients are fed to a cooker extruder such as a twin screw extruder which hydrates and cooks the cereal ingredients to form a cooked cereal mass. The extruder further operates to transform the cooked cereal mass into a cooked cereal dough. In one preferred embodiment, the extruder is operated such as to form an expanded cooked cereal product upon extrusion or a "direct expanded" product. By selection of suitable shaped dies and by sectioning the extrudate generally at the die face, a variety of shaped expanded cereal pieces can be prepared such as puffed spheres. In another variation, the cooked cereal dough can be extruded in the form of unexpanded pellets that, after moisture adjustment, are suitable for expansion or puffing in a separate puffing step. For example, rings or spherical pellets can be formed and puffed in a separate puffing step such as a gun puffing operation. In still another variation, the cooked cereal dough is extruded in the form of a rope or sheet which can subsequently be formed into pellets for finish drying and/or puffing. For example, the ropes or sheets can be formed into planar pieces having a rectangular or square shape that are subsequently dried or puffed to form flat planar pieces or biscuits.

Any conventional enrobing apparatus and technique can be used to practice the present enrobing or application step. Generally, a useful technique involves tumbling.

In preferred variations, the slurry can have a moisture content ranging from ~5-20%, preferably ~10-20% and for best results ~12-18%.

The dry weight ratio of reduced sugar DP3/DP4 bearing slurry can range from about 1:5 to 1 coating 202 to base 201.

In an embodiment of this step, the toasted cereal or uncoated cereal base 201 comprises ~65% of the mixture and the reduced-sugar slurry 202 comprises ~35% of the mixture. The enrobing step can be practiced and the food base or cereal and slurry can be charged in any order to an enrobing apparatus such as a rotating drum and tumbled for a sufficient time to achieve an even distribution of the slurry on the comestible. Preferably, the slurry is added after the base cereal has been added to the drum. Another useful technique is simply spraying the slurry over the food base, which is desirably not tumbled due to the shape, frangibility, etc. Spray nozzles having the desired spray producing characteristics are commercially available and will not be described in detail.

In a preferred embodiment, the slurry coating$_2$ is applied in the form of a hot, reduced-sugar slurry, said slurry being at a temperature of 93-149° C. The reduced-sugar slurry can be applied at temperatures more preferably ranging from 95-127° C., even more preferably 110-121° C.

Optionally, the slurry application step illustrated in FIG. 2 can include adding vitamins, minerals, flavors, and other adjuvant ingredients 204. Suitable adjuvant ingredients further include colors, calcium, preservatives, and supplemental high potency, oil, and mixtures thereof. If present, such ingredients 204 can comprise ~0-2% of the coating composition and be introduced into the enrober 203 to form a vitamin fortified reduced sugar R-T-E cereal. Particularly useful vitamins include vitamins C, A, D, and mixtures thereof. Particularly useful flavors include fruit flavors, cinnamon, vanilla, chocolate, peanut butter, and mixtures thereof. These and other suitable adjuvant ingredients can be conveniently added to the enrober 203 in the form of a sub-stream.

Reference is now made to FIG. 1 which depicts a particular preferred embodiment of the present methods of finished product preparation for providing a finished R-T-E cereal in the form of flakes such as whole grain wheat flakes or corn flakes. As depicted in FIG. 1, it can be seen that the present step of providing a quantity of base of dried food pieces can comprise a first sub-step of providing a cooked cereal dough 112. This sub-step can be conveniently practiced by charging a first, pre-blend of dry ingredients or solids 101 to a cooking vessel such as a cooker extruder especially a twin screw extruder or a James cooler along with a second pre-blend of liquid or wet ingredients 103. The dry ingredients can include one or more cereal ingredients as principal ingredients along with a variety of minor ingredients to improve the taste, appearance, or nutrition of the finished products such as salt, sugar(s), vitamins and minerals. The liquid pre-blend 103 can include added water or moisture such as steam or water and/or the moisture provided by a grain syrup (e.g., malted barley syrup) that provides additional taste and flavor. Moisture can also be provided in the form of steam added directly to the cereal blend. The cooking step can be practiced conveniently in a cooker extruder 102 such as a twin screw extruder or single extruder wherein the dry cereal ingredients are cooked and worked to form a cooked cereal dough. In this preferred embodiment, the cooked cereal dough 112 is provided in the form of moist or wet pellets typically having a moisture content of ~15-25%. In a variation (not shown), the pellet forming is practiced as a separate unit operation or sub-step employing suitable equipment.

As seen in FIG. 1, the present method 10 can include an additional sub-step of adjusting or drying the pellet moisture content to concentrations suitable for forming the pellets into flakes. Conveniently, a pellet dryer 104 can be used to practice the pellet drying step for such moisture adjustments to make a desired texture and toughen the dough to allow further shaping such as to provide the pellets with a moisture content ranging from ~10-15%, preferably ~12-14%. In the embodiment of the method in which cereal flakes are desired, FIG. 1 further depicts a step of introducing the dried pellets from the pellet dryer 104 to a flaking roll 105 to create wet cereal flakes 114.

FIG. 1 further depicts that the present methods, and specifically the step of providing a base of food pieces, can comprise a sub-step of drying the wet cereal flakes 114 such as by toasting to provide a dried food base 116. This toasting operation can by practiced by introducing the wet cereal flakes 114 or other flaked product into a dryer/toaster 106. The drying or toasting step can dry the product or cereal to set its texture and remove more water, which ensures a stable product through shelf life. The high heat associated with toasting a product or cereal can deliver a desirable nutty flavor, a crisp texture, and a golden color. Also, the toasting step expands the flakes decrease their density and improve their texture.

For those food products requiring low moisture content, it is important that any food base drying operation be performed prior to coating the food base with the reduced-sugar coating disclosed and described herein. For example, puffed cereal bases must be dried to a relatively low moisture content to have the desired crispness or frangibility. Thus, when a puffed cereal is the food base in the present methods of preparation, it is preferable to dry the puffed cereal base pieces prior to applying the reduced-sugar coating.

Any conventional drying technique can be used to reduce the moisture content of the cereal base pieces. Drying can be accomplished using equipment such as a rotary bed, tray, or belt dryers. In certain applications, such as the provision of puffed cooked cereal dough pieces by direct expansion from a cooker extruder, the moisture content can be of suitable range without the need for a separate drying step.

Still referring to FIG. 1, in the present methods of preparation can include a step of applying a DP3/DP4 enriched reduced-sugar composition in the form of a slurry 107 having added moisture to coat or enrobe the dried food base 116 to thereby provide an enrobed base 120. The slurry 107 can comprise a dissolved solution of DP3/DP4, sugar, a high potency sweetener, and other ingredients. Conveniently, this step can include the sub-steps of (1) providing a syrup; (2) admixing a mixture of DP3 and DP4 to form a reduced-sugar slurry; and (3) coating a cereal base or other food product with the slurry.

Table 1A shows compositions of the reduced-sugar slurry as a coating for a cereal base.

TABLE 1A

| Ingredient | Weight % (dry) | Preferred | Most Preferred |
| --- | --- | --- | --- |
| Coating | 20-50% | 25-50% | 35-45% |
| Sugar | ≤70% | ≤50% | 30-40% |
| Maltotriose & Maltotetrose | 5-99% | 10-80% | 40-80% |
| High potency sweeteners | 0.01-2% | 0.01-1.5% | 0.03-0.7% |
| Sugar alcohols | 0-15% | 1-15% | 1-12% |
| Triglyceride | 0-40% | 0-10% | ≤10% |
| Cereal Base | ≤75% | 50-65% | 50-60% |

It is an advantage of the present invention that by virtue of using the present DP3/DP4 enriched, low sugar enrobing slurries that the enrobed pieces 120 are characterized by having a reduced level of tackiness or stickiness such as to provide a mass of enrobed pieces 120 that are easily separable from one another rather than forming large chunks or agglomerates not easily broken up such as when high levels of corn syrup are employed in the coating composition. Such a loose agglomerate feature is particularly desirable during those hot and humid times of year when cereal production is more likely to be plagued by such problems. Such reduced adhesion benefits are surprising since otherwise similar reduced sucrose slurries comprising ostensibly similar sugar replacement ingredients such as corn syrups tend to provide coated masses that are undesirably tacky and thus difficult to handle in commercial cereal production operation.

FIG. 1 further depicts that the present methods can include a step of finish drying the enrobed food base 120 to provide a finished dried cereal product 122 such as pre-sweetened cereal flakes. The finish drying step can be practiced, for example, using forced dry hot air having a temperature of ~90-130° C. for ~5-15 minutes. In preferred form, the finished dried cereal product has a final moisture content of ~1-5%, preferably ~2-3% and is in the form of a loose mixture of free flowing individual coated pieces. Conveniently, this finish drying step is practiced in a finish dryer 109.

It is an advantage of the present invention that notwithstanding the reduced level of sucrose in the coating compositions that the moisture can be removed in the finish drying operation by practicing the drying step for times and temperatures comparable to those practiced when high sucrose content coatings are employed. Such an experience is in stark contrast to the extended drying times often need to remove the excess moisture from applied coating compositions that contain comparable levels of corn syrup in substitution for sucrose. Since dryer capacity is often the production limiting or bottleneck in commercial cereal manufacture, the minimization of or avoidance of extended drying requirements is of great economic importance and an unexpected benefit of the present invention. Also, due to their large size and footprint, replacing under capacity dryers with larger units of higher drying capacity often is not practical in an existing production facility.

The present methods in one embodiment can further include a finish cooling step wherein the dried product 122 is reduced in temperature from its warm temperature as it exits the finish dryer 109 in an accelerated and controlled manner prior to a packaging step. The finish cooling step provides a cooled finished dried coated cereal product 124. The finish cooling step can allow for any residual tackiness of the coating of the dried product 122 to be reduced as the coating composition is cooled from its warm dryer exit condition through the glass transition temperature of the coating composition to form the cooled product 124.

Thereafter, as illustrated in FIG. 1, the methods can include a step of packaging 111 the cooled dried coated cereal pieces 124 to form a consumer packaged food article such as a box or carton of coated cereal flakes having a reduced sugar coating.

Reference is now made briefly to FIG. 3. FIG. 3 illustrates an embodiment of a method 30 to make other variations including a food base 301 comprising ingredient bits of fruit, cereal, grains, flakes, puffs, oat flakes, nuts, marshmallows, and mixtures thereof wherein the present DP3/DP4 enriched, reduced sugar compositions are employed as a binder to form finished product such as a cluster food product, cereal bars, or other comestible.

The embodiment depicted in FIG. 3 for making clusters discloses the use of the reduced-sugar slurry 302 and a tilted, panning device 303 to agglomerate the bits. The food base 301 can be added to the panning device 303 to adhere the bits to the external surface of the R-T-E cereal pieces or each other. Bits can be 0.5-4 mm, preferably ~0.5-2 mm, and can include fruit pieces, granola, seed bits, candy bits, bran, and mixtures thereof. Bits can be added in a weight ratio of bits to cereal base ranging from ~1:100 to ~25:100, preferably ~5:100 to ~15:100. In this panning process the base addition and slurry addition steps are practiced intermittingly to allow for the particles to accrete and thereby build up to provide clusters of desired size and weight.

Similar to the process for coated cereals, FIG. 3 shows that flavors 304 can be added to the panning device 303 when making clusters.

The coated clusters can then be transferred to a molding/former apparatus 305 for further shaping and molding. For example, while still warm, the coated pieces can be formed into a formable or plastic mass, optionally compressed, and shaped into a formed mass such as a slab or ribbon. The mass can be allowed to cool to room temperatures and solidify into a mat or slab and then cut or sectioned into individual cereal bar pieces 309.

Thereafter, the method can include a step of finish drying the pieces 309 to desired final moisture contents such as in finish dryer 306 to provide finished dried formed pieces 311.

The methods can further include the step of packaging the finished dried formed pieces 311 to provide finished packaged food articles. For example a single bar or a multiplicity of granola pieces or nuggets can be packaged in a sealed moisture barrier pouch fabricated from a flexible packaging film. A number of such pouches (e.g., 4-8) are then placed in a sealed paperboard carton for distribution and sale.

FIGS. 1 and 2 further illustrate an embodiment that includes a step of transferring the coated cereal or other food product from the enrober 108, 203 to a finish dryer 109, 205.

FIG. 3 shows that a cluster food product can also be transferred to a finish dryer 306. The bits upon finish drying adhere to each other or another food base due to the coating and binding properties of the reduced-sugar slurry.

In general, finish drying can set a crispy texture or shell, can impart a crunchiness to the finished product, can increase and prolong a crispy texture in a bowl of milk, can maintain a desirable product density and crispy, airy texture, and can ensure a stable shelf life as it is well known that a proper moisture content can slow rancidity.

In an embodiment of the present method, FIGS. 1 to 3 further show the method can include steps to introduce the finished product to a cooler 110, 210 and 320 before packaging 111, 206, 307. The moisture content of the cooled, finished product at this stage can be ~1-5%. The cooling step can eliminate condensation in the package by cooling the product to room conditions, and can further set the texture of the finished product to make it durable enough for further processing. A step of packaging 111, 206, 307 the finished product can include a vapor/air/light barrier that lessens staling, toughening, and rancidity.

In an embodiment of the present method, FIG. 4 further shows the method 40 can include the steps of: cooking 401 and forming 402 uncoated cereal base pieces 400, including drying 403 and shaping 404 the pieces; applying a reduced-sugar slurry 405 to the cereal base pieces to coat the pieces; toasting 406 the cereal pieces; and packaging 407 the coated R-T-E cereal.

It is to be understood that the above description is intended to be illustrative, and not restrictive. For example, the above-described embodiments and variations can be used in combination with each other. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein."

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A method of preparing a reduced-sugar food product comprising:
   Providing a food base;
   Providing a reduced sugar slurry including: sucrose in an amount of greater than 0% and less than about 44%, 55-80% of a mixture consisting of tri-saccharides and tetra-saccharides, 0.01-2% of at least one high potency sweetener, 1-15% of at least one sugar alcohol, and 40% or less of at least one triglyceride;
   Binding said food base and at least one adjuvant ingredient with said reduced-sugar slurry to make the food product; and then
   Drying the food product.

2. The method of claim 1, wherein the one or more adjuvant ingredient includes vitamins, minerals, and flavors; the food base is in the form of a cereal base and the food product is a Ready-To-Eat (R-T-E) cereal; and the food product is packaged after drying.

3. The method of claim 2, wherein binding the one or more adjuvant ingredient with the cereal base and the reduced-sugar slurry comprises admixing the one or more adjuvant ingredient at a dry weight basis of less than or equal to 2% with the cereal base at a dry weight basis of 50-75% and the reduced-sugar slurry at a dry weight basis of 25-50%.

4. The method of claim 3, further comprising, in said binding step, heating the reduced-sugar slurry to 93-149° C.

5. The method of claim 4, wherein the reduced-sugar slurry is heated to 95-127° C.

6. The method of claim 5, wherein the reduced-sugar slurry is heated to 110-121° C.

7. The method of claim 3, further comprising: after binding the base, reduced-sugar slurry and the one or more adjuvant ingredient to make the R-T-E cereal, drying the R-T-E cereal to less than 5% moisture, and then cooling the R-T-E cereal.

8. The method of claim 7, wherein the R-T-E cereal is dried to 1-2.5% moisture prior to packaging.

9. The method of claim 2, wherein the food base is in the form of clusters of food ingredients, and the method comprises:
   said binding by agglomerating the clusters, the reduced-sugar slurry and the adjuvant ingredients to make a comestible; and
   molding the comestible to form the food product before drying the food product.

10. The method of claim 9, wherein binding the the one or more adjuvant ingredient with the clusters and the reduced-sugar slurry comprises admixing the the one or more adjuvant ingredient ingredients at a dry weight basis of less than or equal to 2% with the clusters at a dry weight basis of 50-75% and the reduced-sugar slurry at a dry weight basis of 25-50%.

11. The method of claim 10, wherein the food product is dried to less than 5% moisture.

12. The method of claim 11, wherein the food product is dried to 1-2.5% moisture.

13. The method of claim 1, wherein
   the binding the food base constitutes binding clusters of food ingredients with the reduced-sugar slurry, with the clusters comprising bits of fruit, cereal, grains, flakes, puffs, oat flakes, nuts, and marshmallows and the method further comprises adding bits to a cereal base in forming the food product.

14. The method of claim 13, wherein the bits range in size from 0.5-4 mm.

15. The method of claim 1, wherein the mixture consisting of tri-saccharides and tetra-saccharides constitutes a mixture of maltotriose and maltotetrose.

16. The method of claim 15, wherein the reduced-sugar slurry comprises:
   greater than 0% and less than about 44% sucrose;
   55-80% of the mixture consisting of tri-saccharides and tetra-saccharides;
   0.01-1.5% of the at least one high potency sweetener;
   1-15% of the at least one sugar alcohol; and
   10% or less of the at least one triglyceride.

17. The method of claim 16, wherein the reduced-sugar slurry comprises:
  30-40% sucrose;
  55-80% of the mixture consisting of tri-saccharides and tetra-saccharides;
  0.03-0.7% of the at least one high potency sweetener;
  1-2% of the at least one sugar alcohol; and
  less than 10% of the at least one triglyceride.

18. The method of claim 16, wherein the reduced-sugar slurry further comprises 10-30% corn syrup solids.

\* \* \* \* \*